United States Patent [19]
Stevens

[11] B 3,981,976
[45] Sept. 21, 1976

[54] PROCESS FOR HYDROGEN ISOTOPE CONCENTRATION BETWEEN LIQUID WATER AND HYDROGEN GAS

[75] Inventor: William H. Stevens, Deep River, Canada

[73] Assignee: Atomic Energy of Canada Limited, Ottawa, Canada

[22] Filed: July 13, 1973

[21] Appl. No.: 379,177

[44] Published under the second Trial Voluntary Protest Program on January 27, 1976 as document No. B 379,177.

Related U.S. Application Data

[63] Continuation-in-part of Ser. No. 104,291, Jan. 6, 1971, abandoned.

[30] Foreign Application Priority Data

Jan. 28, 1970 Canada .................................. 73320

[52] U.S. Cl. ............................. 423/580; 423/648; 252/430
[51] Int. Cl.² ........................................... B01D 5/02
[58] Field of Search ............ 423/580, 648; 208/110; 117/135.5; 252/430, 459

[56] References Cited
UNITED STATES PATENTS

| | | | |
|---|---|---|---|
| 2,540,599 | 2/1951 | Segura ................................. | 252/430 |
| 2,575,577 | 11/1951 | Beauchamp ..................... | 117/135.5 |
| 2,690,379 | 9/1954 | Urey et al. ......................... | 423/580 |
| 2,722,504 | 11/1955 | Fleck .................................. | 208/110 |
| 2,976,253 | 3/1961 | Edwards ............................. | 252/430 |

*Primary Examiner*—Earl C. Thomas
*Attorney, Agent, or Firm*—F. W. Lemon; J. R. Hughes

[57] ABSTRACT

A process for hydrogen isotope exchange and concentration between liquid water and hydrogen gas, wherein liquid water and hydrogen gas are contacted, in an exchange section, with one another and with at least one catalyst body comprising at least one metal selected from Group VIII of the Periodic Table and preferably a support therefor, the catalyst body has a liquid-water-repellent, gas permeable polymer or organic resin coating, preferably a fluorinated olefin polymer or silicone coating, so that the isotope concentration takes place by two simultaneously occurring steps, namely,

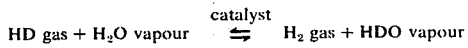

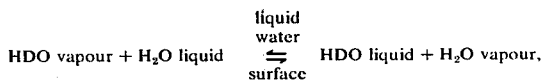

while the hydrogen gas fed to the exchange section is derived in a reactor vessel from liquid water that has passed through the exchange section.

13 Claims, 6 Drawing Figures

PROCESS FOR HYDROGEN ISOTOPE CONCENTRATION BETWEEN LIQUID WATER AND HYDROGEN GAS

This application is a continuation-in-part of application Ser. No. 104,291 filed Jan. 6, 1971, and now abandoned.

This invention relates to a process for hydrogen isotope concentrations between liquid water and hydrogen gas.

More particularly, the present invention relates to a process for increasing the concentration of at least one of a plurality of hydrogen isotopes, namely protium (symbol H), deuterium (symbol D), or tritium (symbol T) in liquid water, by donation from gaseous hydrogen derived from the liquid water. The expression "donation from gaseous hydrogen" is used because, as will be explained later, a unique feature of the present invention is that the actual hydrogen isotope exchange does not occur directly between the water in liquid form and the gaseous hydrogen even though liquid water and gaseous hydrogen are brought together in the presence of a catalyst assembly.

Important present day uses for processes for hydrogen isotope concentration in liquid water or gaseous hydrogen are related particularly to the field of nuclear energy and include, for example:

1. The production of heavy water, that is to say water highly enriched in the deuterium isotope, for use as a moderator in a nuclear reactor, and
2. The reconcentration of the deuterium oxide in heavy water that has become downgraded, that is to say diluted with ordinary water to a low deuterium content during use in, for example, a nuclear reactor.

A potential use for processes for hydrogen isotope concentration in liquid water and gaseous hydrogen is to reduce the tritium concentration, present for example as DTO, in heavy water that has been used in an operating nuclear reactor for some time as a moderator and/or coolant. Such a reduction of the tritium concentration, produced by the reaction of a neutron with the nucleus of a deuterium atom, is desirable because tritium is radioactive, and tritiated water can be incorporated into the body water of nuclear reactor maintenance workers by inhalation, ingestion, or transpiration through the skin.

A further potential use for processes for hydrogen isotope concentration in liquid water and gaseous hydrogen, which could become important in the future, is for the concentration of deuterium and tritium to supply fuel for one or more of the energy producing nuclear processes commonly known as "controlled nuclear fusion," and which are presently being developed in the major industrial nations.

The deuterium isotope of hydrogen, which has an approximate atomic weight of two compared with one for protium, is normally present in hydrogen gas, water or any chemical compound containing hydrogen, in only very low concentrations. The percentage natural abundance of deuterium in hydrogen is given as 0.0150 percent in the well known "Handbook of Chemistry and Physics", 49th edition (1968–69), published by the Chemical Rubber Company, Cleveland, Ohio. The deuterium content present in natural, untreated water is usually within the range of 0.012 to 0.016 percent (one hundred and twenty to one hundred and sixty parts per million) depending on the source of the untreated water. In polar regions the deuterium concentration has even been found to be below one hundred parts per million. Thus to produce heavy water, that is liquid water that is highly enriched with deuterium, at a rate of say one hundred tons per year from untreated feed water requires the processing of well over one thousand gallons of the untreated feed water per minute, and for a process to do this economically the process must be very efficient.

It is an object of the present invention to provide a process for concentration of the hydrogen isotope deuterium between liquid water and hydrogen gas which is economically more efficient than known processes.

The search for an economical process to produce deuterium enriched liquid water, that is heavy water, in the United States of America began in the early days of the Manhattan Project in 1941. A record of the work done under the Manhattan Project to develop such a process is contained in "Production of Heavy Water," Vol. 4F of Division III of the National Nuclear Energy Services, Manhattan Project Technical Section, McGraw Hill (1955). Since then it has been found that the concentration of the isotope in hydrogen gas, water, and many other compounds containing hydrogen can be changed quite readily by a number of physical and chemical processes. For example, F. T. Barr and W. P. Drew, as recorded in Chemical Engineering Progress, Vol. 56, No. 3, pages 40–56, 1960, surveyed ninety-eight processes, not including such established methods as water distillation; hydrogen distillation; dualtemperature exchange between water and hydrogen sulfide; conventional electrolysis of water; hydrogen/ammonia high pressure, dual-temperature exchange; and single temperature hydrogen-water vapour catalytic exchange, with electrolytic regeneration of enriched hydrogen, commonly known as the Trail Process. Eight promising methods for producing heavy water, from the ninety-eight processes, are discussed in more detail, with an economic assessment, in the above mentioned article by F. T. Barr and W. P. Drew. Four of the eight processes thought to be promising are chemical exchange processes, one being for the catalytic exchange of hydrogen isotopes between hydrogen gas and liquid water, but a suitable catalyst to make this process economically viable was not available prior to the present invention being conceived.

More recently, a report was prepared for the United States Heavy water Reactor Base Program by J. A. Ayres entitled "Production of Heavy Water-Status Report," Batelle Memorial Institute, Pacific Northwest Laboratory, Richland, Wash., 99353, Report No. BNWL-884 UC-80, Reactor Technology, March 1969. It is instructive for an understanding of the advance contributed to the art by the present invention to quote from page 152 of Ayres' report:

"$H_2O$—HD. The $H_2O$—HD exchange is a process of very high potential, but at present it is not competitive because no suitable catalyst has been developed. The catalyst must be relatively inexpensive to use, not corrosive, and must effect a rapid reaction rate. An expensive catalyst could be used if it could be economically recovered or if it were present as a stable bed and not removed by the liquid or gas".

It is a further object of the present invention to provide a process for hydrogen isotope concentration between liquid water and hydrogen gas which does not suffer to the same extent the problems associated with the known catalytic exchange process of hydrogen isotopes between liquid water and hydrogen gas.

In a chemical, hydrogen isotope exchange process between two substances, each of which contains hydrogen and is capable of containing more or less of the desired hydrogen isotope, the concentration of the desired hydrogen isotope in each substance under conditions of substantial chemical equilibrium are determined by nature and are normally expressed by what is known as an "equilibrium constant." For the hydrogen/water isotope exchange involving protium (H) and deuterium (D), the isotope exchange reaction may be expressed as:

$$H_2O + HD \rightleftharpoons HDO + H_2 \qquad (1)$$

The equilibrium exchange constant K for this isotope exchange reaction is then expressed as:

$$K = \frac{(HDO) \times (H_2)}{(H_2O) \quad (HD)} \qquad (2)$$

where the parenthesis indicate concentration in some suitable units such as pound moles per cubic foot, the units cancelling in this case so that K is dimensionless. The numerical value of K changes with temperature and also differs slightly depending on whether the isotopic exchange is occuring between liquid water and hydrogen gas or between water vapour and hydrogen gas. The following values for K at several temperatures are from data quoted in the above mentioned Ayres report:

TABLE 1

| TEMPERATURE (°C) | K (LIQUID WATER) | K (WATER VAPOUR) |
|---|---|---|
| 0 | 4.70 | 4.19 |
| 100 | 2.74 | 2.65 |
| 250 | 1.80 | 1.83 |
| 600 | 1.52 | 1.28 |

The mathematical equations that best fit the experimental data for K are:

$$\log K = \frac{238}{T(°C)} - 0.200, \text{ and} \qquad (3)$$

$$\log K = \frac{188}{T(°C)} - 0.095 \qquad (4)$$

From equations (1) and (2), and from the values For K obtained from the table 1 or equations (3) and (4), it is apparent that the deuterium isotope will always attain a higher concentration in water, with the water either in the liquid or vapour phase, than in hydrogen gas in contact with it, at equilibrium below 600°C. It is also evident that the lower the temperature, the more the deuterium will concentrate in the water. Similar chemical isotope exchange reactions between water and the hydrogen isotopes, and their equilibrium constants, are known for all the combinations of reactions, for all the hydrogen isotopes and a person skilled in the art can calculate the concentrations of any, or all, of the hydrogen isotopes in hydrogen gas and water in contact with each other at chemical equilibrium, at a given temperature. All of the above information concerning equilibrium concentrations amongst the hydrogen isotopes is well known to those skilled in the art and can readily be used by them to determine the optimum conditions for the isotopic enrichment of hydrogen gas or water in liquid or vapour phase desired and the appropriate draw-off point for the enriched liquid water or water vapour in an isotope enrichment cascade of the type that will be described with reference to the accompanying drawings.

Catalysts that are very effective for bringing about isotope exchange and approach the equilibrium between water vapour and hydrogen gas are well known and include Group VIII metals, in particular platinum and nickel. However, when such catalysts are used in contact with liquid water, as taught by U.S. Pat. No. 2,690,371, dated Sept. 28, 1954 (H. C. Urey et al.) and U.S. Pat. No. 2,787,526, dated Apr. 2, 1957, J. S. Spevack, the rate of approach to equilibrium conditions attained is two to three orders of magnitude lower than the rate attained when the catalyst is in contact with water in the vapour phase only. Further, when a catalyst such as platinum or nickel is brought into contact with liquid water the catalyst rapidly becomes poisoned and ceases to function. Thus while Urey et al. and Spevack have both taught using a catalyst such as platinum since Apr. 2, 1957, persons skilled in the art have been unable to put this into practice in a feasible manner from an economical point of view. In fact persons skilled in the art have been led, in attempting to practice the teachings of either Urey et al. or Spevack, to the conclusion that a catalyst such as platinum cannot be used in contact with liquid water under any circumstances and be economically acceptable.

In order to design an economical process for hydrogen isotope separation based on isotope exchange between hydrogen and water it is necessary to combine several, consecutive exchange stages or steps, in a manner commonly known as a cascade process, as described, for example, in Nuclear Chemical Engineering, by M. Benedict and T. H. Pigford, McGraw-Hill, 1957. The cascade process requires hydrogen gas and water to flow substantially in opposite directions at least between stages, although not necessarily within each stage, and this can only be accomplished at reasonable cost if the water is in the liquid state at least between stages. The most economical and efficient way to accomplish the opposite flow is to keep the bulk of the water continuously in the liquid state and flow this counter-current to the gaseous hydrogen except for the water vapour that of necessity is contained as humidity in the hydrogen gas in contact with the liquid water. It has been frequently stated in the pertinent literature that this process would be very attractive if the rate of the hydrogen isotope exchange was sufficient for the process to be economically feasible.

It is an object of the present invention to provide a process for hydrogen isotope concentration between liquid water and hydrogen gas, and a catalyst assembly, wherein the rate of the hydrogen isotope exchange reaction is at a sufficiently rapid rate that the process attains an economic advantage over known hydrogen isotope concentration processes.

The only process so far that has been used successfully to produce several hundred tons of heavy water per year at one installation has been one of the processes disclosed in U.S. Pat. No. 2,787,526, (J. S. Spevack), and it is commonly known as the GS process. The GS process uses hydrogen isotope exchange between hydrogen sulfide and liquid water, as expressed by the reaction:

$$H_2O + HDS \rightleftharpoons HDO + H_2S$$

in a dual temperature counter-current cascade, and is an ionic process and does not require a catalyst.

A problem that exists with the hydrogen gas, water vapour exchange process is that for the cascade process to function it is necessary for the hydrogen gas and water vapour to flow in opposite directions and since both are in gaseous form this is an impractical thing to accomplish.

It is an object of the present invention to provide a process for hydrogen isotope concentration between liquid water and hydrogen gas, and a catalyst assembly therefor, which utilizes the following simultaneously occurring, two step exchange process which, until the advent of the present invention, was impossible to put into practice:

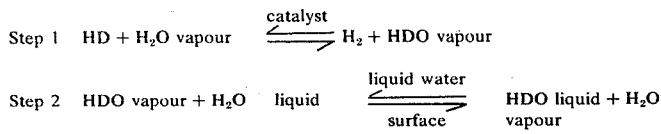

These two steps are achieved, according to the present invention, by providing at least one catalyst assembly having a catalyst selected from the group consisitng of at least one Group VIII metal, and a coating substantially preventing the catalyst from contact with liquid water while allowing hydrogen gas and water vapour to rapidly contact the catalyst, whereby even though liquid water and hydrogen gas are brought into contact with the, or each, catalyst assembly, the exchange occurs by the above mentioned two steps.

It has already been proposed in the following disclosures to provide a catalyst with a coating, however, none of these proposals would lead a person skilled in the art to practice the present invention for the reasons given:

U.S. Pat. No. 2,976,253, dated Mar. 21, 1961, O. D. Edwards

A catalyst is provided with a temporary protective coating against catalyst deterioration from moisture and attrition. The coating has to be substantially moisture, including water vapour, impermeable. The thickness envisaged of 0.5 to 10 mils thick verifies this point.

U.S. Pat. No. 2,540,599, dated Feb. 6, 1951, M. A. Segura

A catalyst for a hydrocarbon synthesis process wherein feed gases containing carbon monoxide and hydrogen are contacted under synthesis conditions (300°F to 800°F are mentioned) with iron containing catalyst particles, bonded together by an organic thermosetting resinous material, to prevent fragmentation of the catalyst caused by forces accompanying the deposition of carbonaceous material thereon. The bonding together of the iron containing catalyst particles by an organic thermosetting resinous material as taught by Segura would prevent hydrogen gas or water vapour from contacting the catalyst of the present invention at the cold temperature of 25°C at which hydrogen isotope exchange must be able to occur for the process to be operable.

U.S. Pat. No. 2,722,504, dated Nov. 1, 1955, R. N. Fleck

A particle form adsorbent catalytic contacting material stable at temperatures in excess of 500°F comprising (1) a major proportion of activated oxide selected from the group consisting of silica-gel, activated alumina and mixtures thereof, (2) a minor proportion, between about 5 percent and 25 percent by weight, of a catalytic agent selected from the class consisting of the oxides and sulfides of transitional metals having an atomic number between 22 and 42, and (3) an intimately bonded coating of an organophilic silicone, said silicone coating having been formed in situ by adsorbing onto the active surface of said activated oxide a monomeric silicone precursor having the formula:

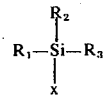

wherein $x$ is a hydrolyzable group, $R_1$ is a non-hydrolyzable hydrocarbon radical bonded to Si through a carbon atom, and $R_2$ and $R_3$ are selected from the class consisting of hydrolyzable groups and non-hydrolyzable hydrocarbon radicals bonded to Si through a carbon atom, then hydrolyzing the adsorbed siliconeprecursor to form an adsorbent substrate containing intimately bonded silicone in amounts corresponding to between about 0.001 and 5 percent by weight of silicone, relative to the final catalyst composition. This catalyst was designed for use at temperatures in excess of about 500°F at which temperatures the silicone would be expected to be permeable to gaseous matter. This catalyst coating could not be used in the presence of water vapour at temperatures in excess of 500°F because the silicone coating would decompose at these temperatures in the presence of the water vapour. Thus Fleck's teachings would tend to lead a person skilled in the art to believe that, in practicing Fleck's invention, such silicone coatings could not be used in the presence of water vapour.

Furthermore since none of the above patents, in combination with any prior art, teach the two step exchange process according to the present invention, then it is apparent that the present invention represents a novel and unforseen contribution to the art.

According to the present invention there is provided a process for hydrogen isotope exchange and concentration between liquid water and hydrogen gas, comprising:

a. contacting at a temperature in the range 15°C to 70°C, in an exchange section, liquid feed water and, hydrogen gas from a reaction vessel, with one another and with a catalyst consisting of at least one catalytically active metal selected from Group VIII of the Periodic Table so that the hydrogen isotope is concentrated in the liquid water passing through and leaving the exchange section, b. passing the liquid water thus enriched with the hydrogen isotope concentrated therein to the reaction vessel wherein the hydrogen gas for the exchange section is generated from a portion of the enriched water and then passed through the exchange section, and c. removing a portion of the enriched water from the exchange section and wherein the improvement comprises:

d. the catalyst is provided in the exchange section as at least one catalyst assembly comprising the catalyst and a substantially liquid-water-repellent organic polymer or resin coating thereon, which is permeable to water vapour and hydrogen gas, whereby:

e. the hydrogen isotope exchange and concentration in the exchange section as follows:

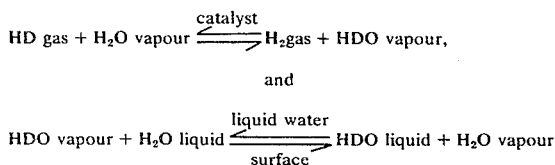

so that direct contact between the catalyst and liquid water is retarded by the coating, thereby retarding poisoning of the catalyst by the liquid water.

In one practical embodiment of the present invention the enriched liquid water having the hydrogen isotope deuterium concentrated therein is withdrawn from between the exchansection and the reaction vessel.

Preferably the or each catalyst assembly comprises a catalyst support, the catalyst and the substantially liquid-water-repellent organic polymer or resin coating thereon, and the catalyst support consists of at least one material selected from the group carbon, graphite, charcoal, alumina, magnesia, silica, silica gel, chromia, molybdenum oxide, tungstic oxide, nickel oxide, kieselguhr and metal substrate.

Preferably the total amount of catalyst is not greater than 5 percent by weight of the total weight of the catalyst assembly, and the total amount of the substantially liquid-water-repellent organic polymer or resin coating is not greater than 10 percent by weight of the total weight of the catalyst assembly.

More particularly the total amount of catalyst is preferably not greater than 0.5 to 1.0 percent by weight of the total weight of the catalyst assembly, and the catalyst is dispersed in an outer layer of the support.

The coating may be of polytetrafluoroethylene having a fibrous network or mesh structure, and the polytetrafluoroethylene may be applied to the catalyst as a colloidal suspension, the dispersing liquid evaporated, and the particles sintered to form the fibrous network or mesh structure.

In different embodiments of the present invention the coating may be a silicone, for example a polysiloxane such as polyalkylsiloxane having substituent groups selected from hydroxyl, methoxyl, and ethoxyl. Furthermore the coating may comprise a polydimethylsiloxane having a minor amount of substituent groups selected from hydroxyl, methoxyl, and ethoxyl and include at least one substituent selected from ethyl, propyl, isopropyl and t-butyl groups.

When the coating is a silicone the coating is preferably about 1 to 10 percent by weight of the catalyst assembly, more specifically 2 to 5 percent by weight of the catalyst assembly, and the coating is preferably from about $10^{-3}$ to $10^{-1}$ microns average thickness.

Preferably the support is selected from carbon, graphite, charcoal, alumina, magnesia, silica, silica gel, chromia and nickel oxide and the catalytically active metal is selected from Pt, Rh, Pd and Ni.

A catalyst support is not essential. The catalytically active metal or metals from Group VIII of the Periodic Table can be used alone in any appropriate configuration, or may be supported on another metal, which may for instance be in the form of a wire mesh article. However, economics usually require a suitable high surface area support for the catalytically active metal or metals.

In the accompanying drawings which illustrate, by way of example, embodiments of the present invention.

Figure 3:
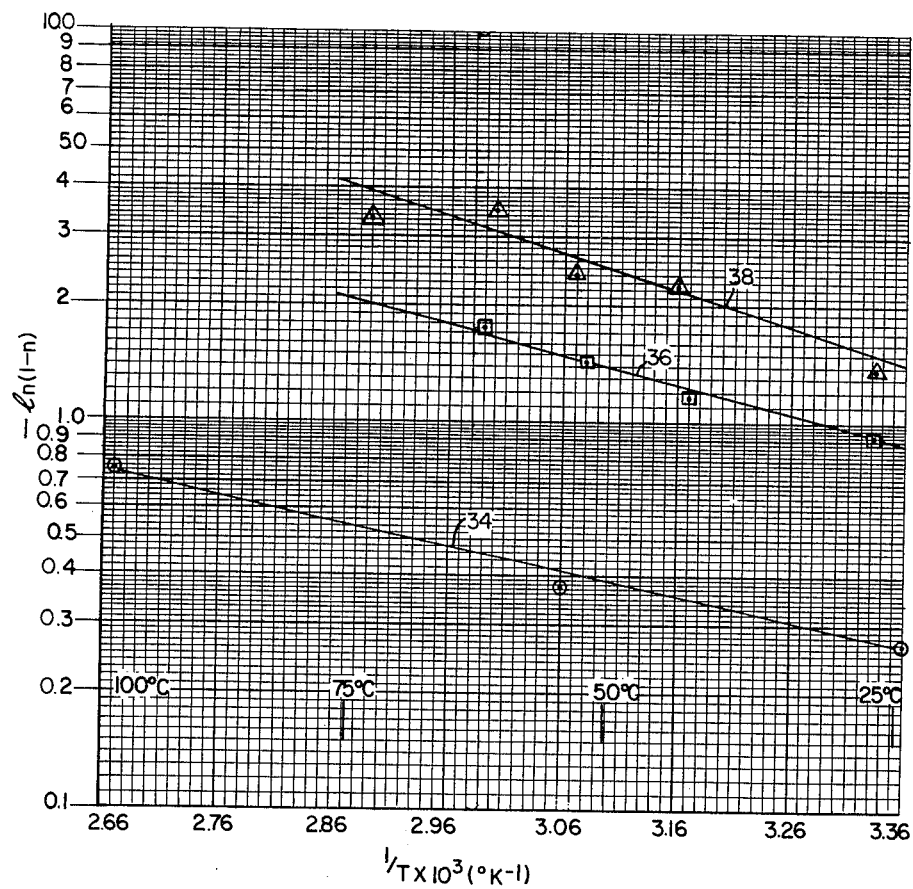
Figure 4:
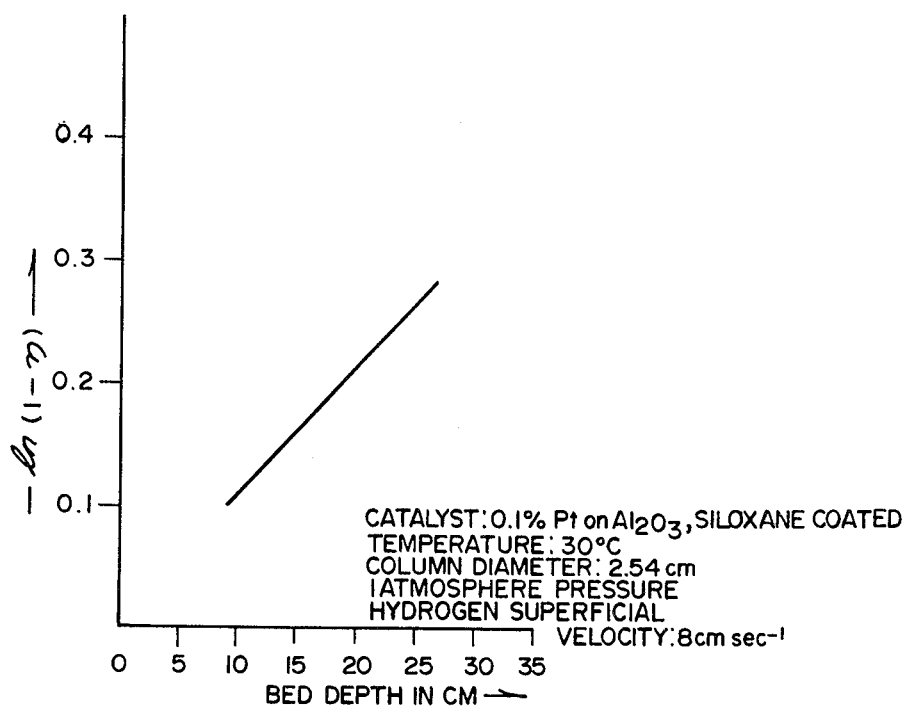
Figure 5:
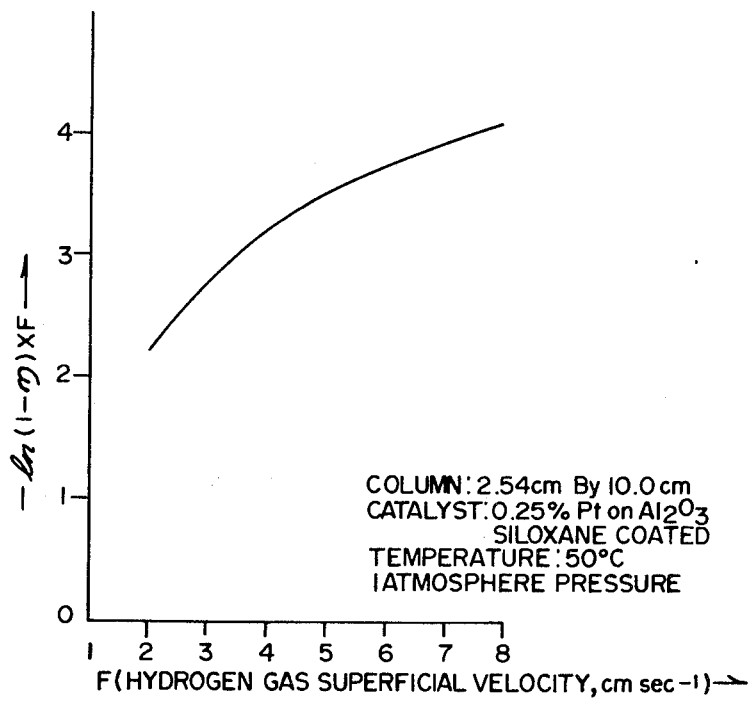
Figure 6:
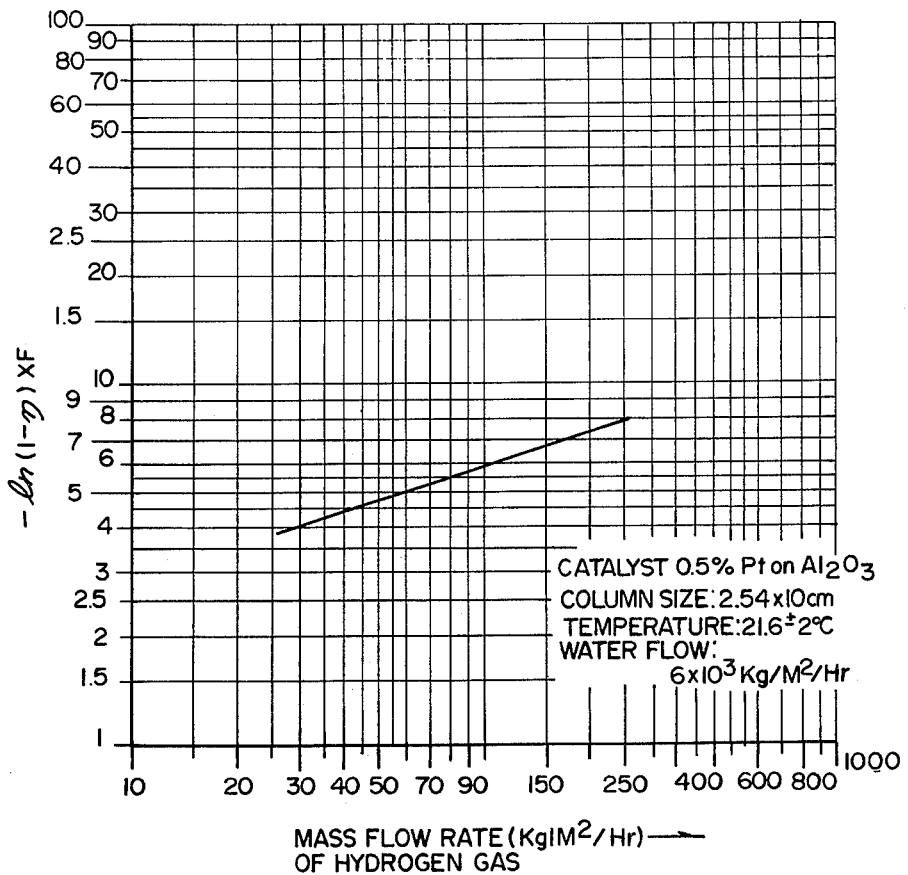

FIG. 3 shows graphs of exchange section efficiencies versus the reciprocal of the absolute temperature at which deuterium is exchanged between water and hydrogen times $10^{-3}$ for a silicone resin coated catalyst, FIG. 4 shows a graph of exchange section efficiencies versus catalyst bed depth, FIG. 5 shows a graph of exchange section efficiencies versus hydrogen gas velocity through the stage, and FIG. 6 shows a graph of exchange section efficiencies versus mass flow rate of feed water.

Figure 1:
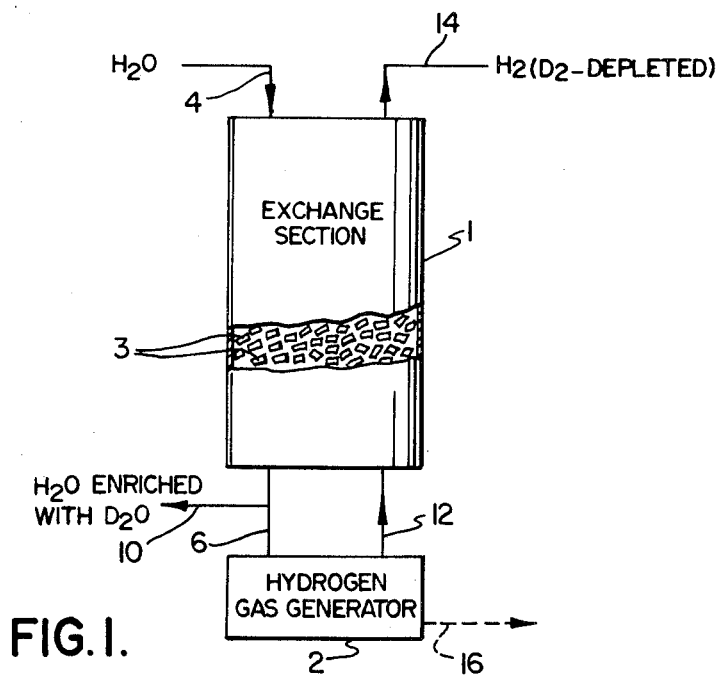
FIG. 1 is a diagrammatic side view, with parts cut away, of apparatus for deuterium concentration between liquid water and hydrogen gas flowing counter current.

In FIG. 1 there is shown an exchange section 1 and a reaction vessel 2. The exchange section 1 is filled with catalyst assemblies 3. The exchange section 1 has a liquid water inlet 4 and a liquid water outlet 6 to the reaction vessel 2. A withdrawal pipe 10 is connected to the outlet 6 for withdrawing liquid water enriched in dueterium from between the exchange section 1 and the reaction vessel 2.

The reaction vessel 2 may be any scheme where liquid water is treated to release the hydrogen therefrom in the form of hydrogen gas. Thus the reaction vessel 2 may be, for example, an electrolytic cell or it may be a water gas-choke chamber or a catalytic chamber for the reaction of methane with water to give carbon dioxide and hydrogen, or any other scheme whereby water is treated to release hydrogen gas. The hydrogen released from liquid water in the reaction vessel 2 is passed to the exchange section 1 by pipe 12. The exchange section 1 has a hydrogen gas outlet 14.

The catalyst assemblies 3 may conveniently be supported in the exchange section 1 on a porous sintered glass or slotted metal support (not shown).

Each catalyst assembly 3 consists of:

a. at least one catalytically active metal from Group VIII of the Periodic table, such as platinum or rhodium or nickel for example in the form of very small crystallites having a diameter typically in the 30 to 200 Angstrom range, b. a highly porous, solid support such as carbon, graphite, charcoal, alumina, silica gel, and the like, with the catalytically active metal deposited on the surface of the pore walls thereof. The support may typically be in the form of granules, pellets, spheres, rings, Berl saddles and the like, which are commonly available, c. a substantially liquid-water-repellent organic polymer or resin coating such as a polyfluorocarbon or silicone deposited on the support, and within and upon the pore surfaces of the support, the coating rendering the catalyst body substantially impermeable to liquid water, but permeable to water vapour and hydrogen gas. In other words the coating substantially prevents bulk liquid water from entering the pores of the porous support, wherein the catalytic material is located, but the entry of water vapour molecules and hydrogen gas molecules and access to the catalytic material by these gaseous molecules is essentially unimpeded.

It is important that the coating of, for example, polyfluorocarbon or silicone does not completely enclose the entire outer surface of the porous support because this would substantially impede free access of water vapour and hydrogen gas into and out of the porous structure of the support and thus impede access to and from the surface of the catalytically active metal crystallites. Examples of how a substantially liquid-water-repellent coating may be applied will be given. It should be apparent, however that the object of the provision of the catalyst assemblies 3 is to prevent bulk liquid water from wetting the outer surfaces of the support, entering the pores of the support, and completely covering the catalyst support surfaces and thus poisoning the catalytically active metal while nevertheless allowing water vapour molecules and hydrogen gas molecules to surround the catalyst body and have free access to and from the interior of the porous support and thus access to and from the catalytically active metal crystallites deposited upon the pore walls within the support. Catalyst preparations consisting of the catalytically active metal and support are commercially available from several manufacturers of industrial catalysts. Substantially liquid-water-repellent coating materials desirable for deposition on said catalysts are readily available from several manufacturers of silicone products and fluorinated hydrocarbons. The scope of the invention is not to be construed to be limited to these particular water repellant materials, but these have been found very suitable.

A commercially available catalytically active metal-and-support combination suitable as starting material for the catalyst assemblies consists of bodies each comprising 0.5% by weight, of the total weight of the body, of platinum as the catalytically active metal on alumina ($Al_2O_3$) bodies forming the catalyst support. The bodies may be ¼ inch balls or ½ inch saddles, for example. Other examples of acceptable catalytically active metal-and-support combinations are described below. The coating may be a thin silicone layer, preferably having an average thickness within the range 1–100 (more particularly 3–10) molecular layers. As described above, the coating covers to a large extent the catalyst support surface, and may be applied by dipping the catalyst bodies in, or spraying them with a solution of a silicone resin, for example, in a petroleum hydrocarbon solvent such as white spirit or Stoddard solvent. The solvent is then evaporated to form a water vapour/hydrogen gas permeable, substantially liquid-water-repellent silicone coating which substantially covers the catalyst support. Preferably the catalyst assemblies thus produced are given an ageing period for example, of at least about 48 hours, before being used to enrich, for example, liquid water with deuterium from hydrogen or vice versa.

The liquid-water-repellent coating may be formed of any other hydrophobic resin or polymer which is permeable to gases, such as polytetrafluoroethylene, polyethylene, polypropylene, or other like hydrophobic hydrocarbon polymer of medium to high molecular weight. However, a coating in the form of a substantially liquid-water-repellent silicone is preferred, which may be for example, a siloxane polymer. The coating may be deposited from a solution (suitably containing about 1 to 10 percent, and preferably 1 to 5 percent, by weight polymer), to deposit a coating of a thickness of about $10^{-3}$ to $10^{-1}$ microns average thickness, or from about 1 to 30 percent (preferably 5 to 15 percent) by weight polymer based on catalyst body (support plus catalytic metal) depending markedly on the support material used.

Dow corning 773 (Registered Trade Mark) Water Repellant obtainable from Dow Corning Corporation, as a resin concentrate containing 33 percent by weight silicone solids has been found to be a suitable coating material. This coating material is preferably applied to a porous support with the catalyst deposited thereon when it is diluted in a mineral spirit or hexane carrier to about 5 percent by weight of the carrier, and the carrier then evaporated. This catalyst is preferably aged for example about 48 hours in air before use, and preferably at 150°C to 200°C.

A very thin polytetrafluoroethylene film has been found to be suitable as the coating for some types of porous supports having the catalyst deposited thereon and these have been found to be quite efficient in promoting the exchange of deuterium between hydrogen gas and liquid water.

As stated polytetrafluoroethylene may be applied to a porous support that already has the catalytic material deposited thereon. Preferably the porous supports with the catalyst deposited thereon are treated with a colloidal suspension of the polytetrafluoroethylene in an aqueous solution of a wetting agent. One such colloidal suspension is Du Pont TFE — Fluorocarbon Resin Dispersion, Type 30 obtainable from Du Pont, U.S.A. Other colloidal suspensions such as Du Pont 955–100 Line One-Coat, Non-Stick Finishes, obtainable from Du Pont, U.S.A. may also be used.

The suspensions are diluted, more or less, with a dispersing phase, for example water or an organic solvent, depending on the catalyst support used, and are then applied to the porous support with the catalytic material thereon before coagulation of the polytetrafluoroethylene occurs. The dispersing phase is then allowed to evaporate, or is removed in some other conventional manner. The polytetrafluorethylene particles which have been deposited on the surfaces of the porous support and catalytic material are then sintered together by heating, for example, in air at 350° to 360°C for ten minutes to an hour.

It should be noted that it is not an objective to form a complete or coherent film over the entire porous support and catalyst surfaces, and that the polytetrafluoroethylene coating produced has more of a fibrous network or mesh structure than a continuous, coherent film structure, and thus has considerable microporosity. For a porous support the objective of the coating is, as already stated, to exclude liquid water from the internal pores of the support wherein is located catalytically active metal, but allow essentially free entry by water vapour and hydrogen gas molecules.

Scanning electron microscope photographs (SEM) have confirmed that the improved catalysts of the invention have this fibrous or mesh structure of the polytetrafluorocarbon coating.

The conventional use for these colloidal suspensions is to provide a non-stick or non-wet surface, and for these uses the aim is for the polytetrafluoroethylene coating to have as little porosity as possible.

Proper development of the polytetrafluoroethylene coating on the support with the catalyst deposited thereon depends on having the correct amount of polytetrafluoroethylene particles deposited thereon prior to sintering. The correct amuont of polytetrafluoroethylene particles deposited on the support with the catalyst thereon is dependant upon the dilution of the polytetrafluoroethylene suspension and the volume of the suspension taken up by the catalyst when the suspension is applied to it. Dilutions of the commercial polytetrafluoroethylene dispersions of the order of from ten to more than one hundred fold may be required, depending on the porosity of the catalyst support.

Other fluorinated olefin polymers can be used to form the coating.

With perfluorinated ethylene-propylene copolymers (FEP-type Teflon) a lower sintering temperature than for polytetrafluoroethylene should be used to avoid forming an impervious layer.

Polymers of chlorotrifluoroethylene could also be used to form the coatings.

As in the previous embodiments, when using a polytetrafluoroethylene waterproof coating, the catalyst material is a Group VIII metal, and is preferably Pt, Rh, Ir, Pd, or Ni deposited on the catalyst support.

When using a polytetrafluoroethylene liquid-water-repellent coating the catalyst support is preferably a porous or relatively high surface material, such as a porous ceramic, a porous glass or a porous metal body having a large fraction of any pores, or porosity greater than, say, about 0.1 microns in diameter. The pore size is chosen to obtain a high surface area, yet to allow the colloidal polytetrafluoroethylene particles to enter a majority of the pores and become deposited on the surface of the pores, thus serving to more completely wet-proof the catalyst material in the surface pores. Porosity throughout the catalyst support is not essential, however.

In another embodiment, Pt on a high surface area carbon black powder support, available from several commercial catalyst manufacturers, is slurried with a fluid suspension of colloidal polytetrafluoroethylene particles and the resulting suspension is then applied to a porous ceramic body in a manner similar to that described above for application of a polytetrafluoroethylene coating. In this case, the polytetrafluoroethylene serves not only to wetproof the catalyst body but also to hold the Pt/carbon catalyst particles in place upon a larger inert support.

Non-porous ceramic catalyst supports, roughened by treatment for several hours with 30 percent by weight sodium hydroxide solution at 60°C, or by treatment with hydrofluoric acid-fluoride etching media have also been used successfully as catalyst supports for platinized and polytetrafluoroethylene coated catalyst according to the invention. However, tests have indicated that higher catalyst activity is obtained using a porous support.

The size of the catalyst assemblies according to the invention, having a liquid-water-repellent coating, is chosen to suit the size of the column used according to conventional, good chemical engineering practice. The shape of the catalyst assemblies according to the invention may be any of the several conventional shapes known to chemical engineers, such as for example, those known as Intalox (trademark — Norton Co.) saddles, Berl saddles, Rashig rings, and Lessing rings, or any other efficient shape for tower packing and designed for counter-current or co-current flow with a gas and a liquid.

The criterion for selecting a particular catalyst material and a particular waterproof coating and a particular catalyst body shape is to achieve a high stage efficiency for the process whilst at the same time using a small bed of catalyst assemblies.

Catalyst assemblies according to the present invention and consisting of Pt or Pd on alumina and with a siloxane coating appear to retain their original grey colour and appear to be enveloped in a very thin gas sack when operating as will be described with reference to FIGS. 1 and 2 of the accompanying drawings. It should be noted that an uncoated catalyst similarly deposited on supports, rapidly changed colour from grey to black when submerged in water and this is an indication that it was rapidly poisoned.

The following summarises what materials are preferred at present for the various parts of the catalyst assemblies according to the present invention:

CATALYTIC MATERIALS

Group VIII metals; in particular Pt, Ni, Ir, Rh and Pd

CATALYST SUPPORT

Carbon, graphite, charcoal, alumina ($Al_2O_3$), magnesia, silica ($SiO_2$), silica gel, chromia ($Cr_2O_3$), nickel oxide (NiO) in the usual porous forms such as granules, pellets, right cylinders, spheres or extruded shapes;

SUBSTANTIALLY LIQUID-WATER-REPELLENT COATING

Polytetrafluoroethylene is a preferred waterproof coating. Other waterproof coatings are for example, silicone resins consisting of semi-polymerized methyl siloxanes with some percentage of silanol, methoxy or ethoxy, groups attached to the siloxane structure. Usually, a polyalkylsiloxane is preferred, substituted with sufficient hydroxyl (silanol), methoxy/or ethoxy/ groups for post-application crosslinking, and chemisorption or chemical bonding to the support with the catalyst thereon, and optionally, with some higher alkyl (ethyl, propyl, isopropyl, t-butyl) groups for improved stability.

Referring again to FIG. 1, in operation liquid water containing deuterium is fed by pipe 4 into the exchange section 1 and trickles downwardly over the catalyst assemblies 3 therein to the outlet pipe 6. The liquid water flowing along the outlet pipe 6 enters the hydrogen gas generator or reflux section 2 where hydrogen gas is released from the water and passed along the pipe 12 into the exchange section 1. The hydrogen gas entering the exchange section 1 flows upwardly around the catalyst assemblies 3 in contact with them and the water trickling downwardly over them. The temperature in the exchange section 1 is maintained, by means not shown, a temperature in the range 15°C to 70°C. The hydrogen gas leaves the exchange section 1 by pipe 14.

Either or both exchange section/and hydrogen gas generator 2 may be operated at atmospheric, above atmospheric or below atmospheric pressure. If the hydrogen gas generator pressure is operated at an equal or lower pressure than the exchange section pressure, the hydrogen gas pressure must be raised for the hydrogen gas to enter the exchange section 1.

A certain quantity of water enriched in deuterium is withdrawn through pipe 10 continually or batchwise as desired. Feed water flowing through pipe 4 over any extended operation period equals water decomposed to supply hydrogen reflux from the hydrogen gas generator 2 plus water withdrawn through pipe 10. The liquid water drawn off through pipe 4 is enriched in deuterium by an amount depending mainly on the activity of the catalyst, the fluid flow rates, the catalyst bed depth and volume and the temperature of the exchange section.

The exchange section 1 is essentially a means for counter current contacting of hydrogen and liquid water and for bringing about rapid exchange of hydrogen isotopes between these two fluids.

Within the exchange section 1, although liquid water and hydrogen gas flow countercurrent over the catalyst assemblies 3, the substantially liquid-water-repellent coatings of the catalyst assemblies 3 cause only water vapour and hydrogen gas to mainly contact the catalytically active metal and so at each catalyst assembly deuterium can be transferred by the catalytically active metal to either the hydrogen gas or water vapour depending on the temperature within the exchange section 1. Thus because the exchange section 1 is at a temperature within the range 15°C to 70°C, the water vapour has deuterium concentrated therein. This exchange reaction may best be expressed by the equilibrium equation:

HD gas + H$_2$O vapour $\xrightleftharpoons{catalyst}$ H$_2$ gas + HDO vapour, hereinafter referred to as "Reaction 1."

However, a further, second deuterium exchange reaction occurs simultaneously in the exchange section 1 and is closely coupled with the above exchange reaction. The second deuterium exchange reaction occurs in the exchange section 1 between water vapour enriched with deuterium from hydrogen gas, by the first exchange reaction, and liquid water flowing over the catalyst assemblies 3 in the exchange section 1, and may best be expressed by the equation:

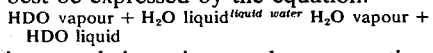
HDO vapour + H$_2$O liquid $\xrightleftharpoons{liquid\ water}$ H$_2$O vapour + HDO liquid This second deuterium exchange reaction ("Reaction 2") is an evaporation/condensation exchange, that is HDO vapour passes into and through the liquid water surface and is replaced by H$_2$O vapour from the liquid water, thus maintaining the dynamic saturation conditions and this may be diagrammatically shown as follows:

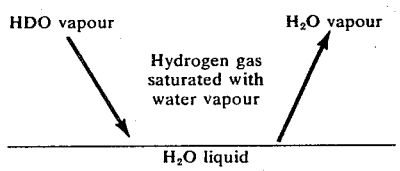

The Reaction 1 above occurs within each catalyst assembly, between hydrogen gas molecules and water vapour molecules that have diffused into the catalyst support, at catalytically active metal surface sites, and accomplishes dynamic hydrogen isotope exchange between hydrogen gas and water vapour molecules. This Reaction 1 leads to the result that the concentration of the hydrogen isotopes in the respective molecules species tends, or changes, toward the natural equilibrium value, which depends on the temperature and relative concentrations of the said species, as already discussed. When water vapour molecules diffuse out of catalyst assemblies 3, they are subject to, and undergo, the Reaction 2. The equilibrium constant for the Reaction 2 depends on the temperature, but differs from unity by only a few percent as shown in the following table

| TEMP °C | $K = \dfrac{(HDO)\ \text{liquid}\ (H_2O)\ \text{vapour}}{(H_2O)\ \text{liquid}\ (HDO)\ \text{vapour}}$ |
|---|---|
| 20 | 1.079 |
| 30 | 1.069 |
| 40 | 1.060 |
| 100 | 1.029 |
| 200 | 1.003 |
| 250 | 0.997 |

The exchange of hydrogen isotopes between water vapour and liquid water, Reaction 2, does not require a catalyst, but as stated above it does require liquid water surface area. It will be noted that below about 200°C the deuterium concentration in liquid water is slightly higher than in the vapour in equilibrium with it and this aids to a small extent in the concentration process.

By means of the two reactions just discussed, hydrogen isotopes are thus effectively exchanged between hydrogen gas and liquid water. As a result of the natural equilibrium constants for the two said reactions, hydrogen isotopes are transferred from one fluid to the other, that is to say from gaseous hydrogen to liquid water or vice-versa depending on the isotopic concentrations in these fluids, and the temperature of these fluids, in proximity with one another and with the catalyst. By means of a counter-current cascade and opposite flow of hydrogen gas and liquid water, through at least one unit comprising one exchange section 1 connected to a hydrogen gas generator 2, one hydrogen isotope is effectively transported in an opposite direction to another hydrogen isotope. Those skilled in the art will know how to combine a number of such units, at the same or different temperatures into a cascade or with one or more such units with other known exchange processes, and how to use water as feed with hydrogen gas recycled, or hydrogen gas as feed with water recycled, in order to accomplish the specific hydrogen isotope separation desired.

In a different embodiment of the present invention liquid water enriched in deuterium is withdrawn from the hydrogen gas generator 2 by pipe 16 (shown dotted) instead of by pipe 10. This embodiment functions essentially in the same manner as the embodiment wherein liquid water enriched in deuterium is withdrawn by pipe 10.

Figure 2:
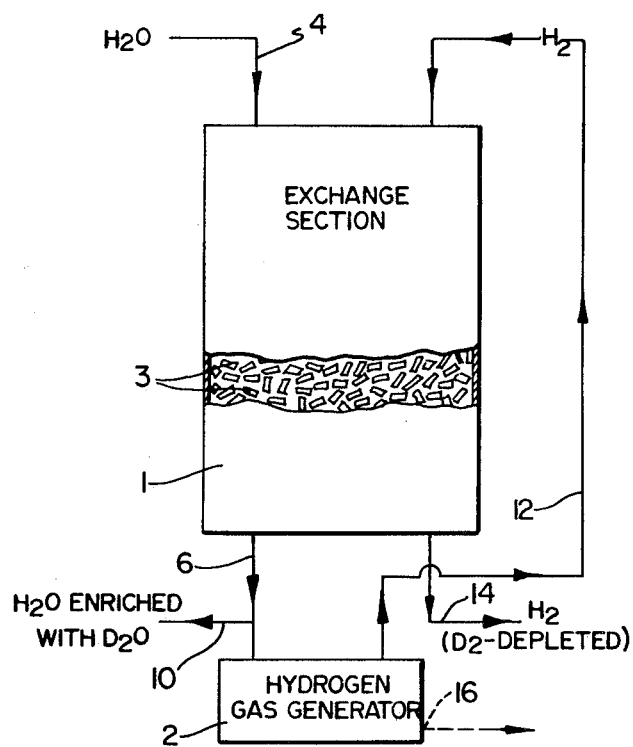
FIG. 2 is a similar diagrammatic side view to FIG. 1, but for deuterium concentration between liquid water and hydrogen gas flowing concurrent.

In FIG. 2, where similar parts to those shown in FIG. 1 are designated by the same reference numerals and the previous description is relied upon to describe them, a similar process is shown but with the liquid water and hydrogen gas flowing concurrently through the exchange section 1.

In one series of experiments, liquid water enriched in deuterium to a D/H ratio of about 1,000 to 10$^6$, and tank hydrogen gas having a D/H ratio of about 100 to 10$^6$, both determined by precision mass spectrometry, were used. The D/H ratio of the effluent hydrogen (dried) was determined by mass spectrometry. Exchange of deuterium from enriched water to a hydrogen gas stream was used for experimental convenience only to demonstrate the activity of the catalyst.

Referring to FIG. 3 there are shown graphs 34, 36 and 38 of some representative single stage efficiencies for a catalyst for the exchange of deuterium in an exchange section 1. The graphs 34, 36 and 38 are semilogarithm plots of a function of $n$ (eta), namely "$-Ln(1-n)$", versus the reciprocal of the absolute temperature at which deuterium is exchanged between water and hydrogen gas times $10^{-3}$. $n$ is defined by relation:

$$n = \frac{A-B}{\frac{C-B}{K_T}}$$

where, $A$ is the D/H ratio of the effluent hydrogen,
$B$ is the D/H ratio of the influent hydrogen,
$C$ is the D/H ratio of the water being contacted, and
$K_T$ is the equilibrium constant for hydrogen/water exchange at the temperature of the overall exchange reaction $H_2O$ liquid + HD $\rightleftharpoons$ HDO liquid + $H_2$ is carried out $n$ is thus a measure of the approach to equilibrium, or the efficiency of a given volume of catalyst. The function plotted, $-Ln(1-n)$ is an indication of reaction rate, and is commonly used in investigating such reactions.

For all of the graphs 34, 36 and 38 the catalyst bodies comprised 3mm × 3mm right cylinder catalyst supports of $Al_2O_3$ with 0.5 percent by weight Pt thereon. The coating was the silicone resin previously referred to as Dow Corning 773 Water Repellent. Also, for all of the graphs 34, 36, 38 flowing, distilled $H_2O$ in liquid form containing 1143 ppm $D_2O$, and flowing hydrogen gas containing 104.4 ppm $D_2$ were used. The molar ratio of water to gas flow was in the range of 5 to 10.

For the graph 34 a bed of the catalyst 2.4 cm diameter × 2.5 cm deep was used and the hydrogen gas was passed through the bed at 7.8 atmospheres pressure and, at a superficial velocity of 7.66 cm/second measured at standard temperature and pressure.

For the graph 36 a bed of the catalyst 2.1 cm diameter × 5.0 cm deep was used, and the hydrogen gas was passed through the bed at the velocity of 1.44 cm/second at one atmosphere.

For the graph 38 a bed of the catalyst 2.1 cm diameter × 5.0 cm deep was used, and the hydrogen gas was passed through the bed at the velocity of 0.44 cm/second, at one atmosphere.

The data shown in the graphs 34, 36 and 38 was obtained to determine behaviour of exchange rate versus temperature.

The effects of:
1. different depths for the bed of catalyst assemblies
2. different apparent gas velocity for the hydrogen gas, and
3. different mass flow rates for the hydrogen gas, when contacting one another and the catalyst assemblies, have been investigated in a similar system and with a similar catalyst.

FIG. 4 shows the effect of bed depth on the exchange efficiency for a siloxane coated 0.1 percent by weight Pt catalyst on an $Al_2O_3$ catalyst support. The column was at a temperature of 30°C and had a column diameter of 2.54 cm by 10.0 cm high. The hydrogen gas was at one atmosphere pressure and the hydrogen gas superficial velocity was 8 cm sec$^{-1}$.

FIG. 5 shows the effect of different hydrogen gas superficial velocities in cm sec$^{-1}$ on the exchange efficiency using a siloxane coated, 0.25% by weight Pt catalyst on a $Al_2O_3$ catalyst support. The column was at a temperature of 50°C and had a column diameter of 2.54 cm by 10.0 cm high. The hydrogen gas was at one atmosphere pressure.

In FIG. 6 the effect on the exchange efficiency for different mass flow rates in Kg/M$^2$/Hr for the hydrogen gas are shown in a log-plot. A polytetrafluoroethylene coated 0.5 percent by weight Pt catalyst on a $Al_2O_3$ catalyst support was used. The tower was at a temperature of 21.6 ± 2°C, and had a column size 2.54 cm diameter by 10 cm high. The liquid water flow rate was $6 \times 10^3$ Kg/M$^2$/Hn. Hydrogen pressure ranged from one to seven atmospheres.

The above hydrogen/liquid water exchange process catalyst bodies according to the present invention may also be used in conjunction with 1. Re-enrichment of hydrogen with deuterium, from liquid water for what are known as the hydrogen/ammonia and/or hydrogen/amine exchange process, for deuterium enrichment;

2. Extraction and transfer of deuterium from hydrogen, at the rich end of a hydrogen/ammonia or hydrogen/amine process, to liquid water;

3. Processes known for the upgrading of heavy water involving, for example, electrolysis of water and recombination of hydrogen and oxygen, or combustion, as phase conversion methods as either end of an exchange stage, 4. Any process wherein efficient exchange and equilibration of hydrogen isotopes between liquid water and hydrogen gas is required as for example decreasing the tritium content in reactor heavy water, and 5. The water vapour/hydrogen gas hydrogen isotopes exchange process.

In this specification permeable to water vapour and hydrogen gas means the catalyst metal surface is accessible to gases including water vapour and hydrogen gas through the coating and the mechanism of access may include passage of molecules through openings in the coating, and diffusion through the coating itself. It is not intended that the present invention be bound by any particular theory of exact function of the coating.

While the process according to the present invention has been described for deuterium exchange and concentration between liquid water and hydrogen, it will be appreciated that exchange will occur simultaneously of protium or tritium if present in the liquid water and hydrogen gas, and that the conditions may alternatively be optimized for tritium separation and recovery in liquid water or hydrogen gas.

In this specification "water repellent" means liquid-water-repellent.

I claim:

1. In an isotope exchange process for hydrogen isotope concentration between liquid water and hydrogen gas, comprising:

a. contacting at a temperature in the range 15°C to 70°C, in an exchange section, liquid feed water and hydrogen gas from a reaction vessel, with one another and with a catalyst consisting of at least one catalytically active metal selected from Group VIII of the Periodic Table so that the deuterium isotope of hydrogen is transferred to and concentrated in the liquid water passing through and leaving the exchange section in either counter-current or cocurrent flow, b. passing the liquid water thus enriched with the deuterium isotope of hydrogen concentrated therein to the reaction vessel wherein the hydrogen gas for the exchange section is generated from a portion of the enriched water and then passed through the exchange section, and c. removing a portion of the water enriched in the exchange section, the improvement comprising:

d. the catalyst is provided in the exchange section as at least one catalyst assembly comprising the catalyst and a substantially liquid-water-repellent organic polymer or resin coating thereon selected from the group consisting of polyfluorocarbons, hydrophobic hydrocarbon polymers of medium to high molecular weight and silicones, and which is permeable to water vapour and hydrogen gas, whereby:

e. the or each catalyst assembly causes hydrogen isotope exchange and concentration in the exchange section as follows:

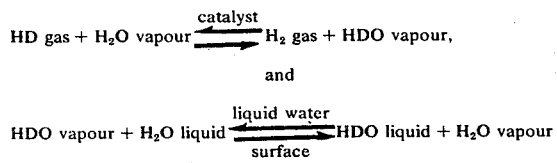

so that direct contact between the catalyst metal and liquid water and wetting of the catalyst is retarded by the coating thereby retarding poisoning of the catalyst by the liquid water.

2. The process according to claim 1, wherein the enriched liquid water having the hydrogen isotope concentrated therein in the exchange section is withdrawn from the reaction vessel.

3. The process according to claim 1, wherein the or each catalyst assembly comprises a catalyst support, the catalyst and the substantially liquid-water-repellent organic polymer or resin coating thereon, the catalyst support consists of at least one material selected from the group carbon, graphite, charcoal, alumina, magnesia, silica, silica gel, chromia, molybdenum oxide, tungstic oxide, nickel oxide, kieselguhr, and metal substrate, and the catalyst is at least one metal selected from the group consisting of Pt, Rh, Ir, Pd or Ni.

4. The process according to claim 3, wherein for the or each catalyst assembly the total amount of catalyst is not greater than 5% by weight of the total weight of a catalyst assembly, and the total amount of the substantially liquid-water-repellent organic polymer or resin coating is not greater than 10% by weight of the total weight of that catalyst assembly.

5. The process according to claim 4, wherein for the or each catalyst assembly the total amount of catalyst is in the range 0.5% to 1.0% by weight of the total weight of that catalyst assembly, and the catalyst is located in an outer surface layer of the support.

6. The process according to claim 1, wherein the coating is polytetrafluoroethylene having a fibrous network or mesh structure.

7. The process according to claim 6 wherein said polytetrafluoroethylene is applied to said catalyst as a colloidal suspension, dispersing liquid is evaporated to leave particles of the polytetrafluoroethylene on the catalyst, and the particles are sintered to form the fibrous network, or mesh structure.

8. The process according to claim 1, wherein said silicone comprises a polysiloxane.

9. The process according to claim 8, wherein said polysiloxane is a polyalkylsiloxane, having a minor amount of substituent groups selected from hydroxyl, methoxyl and ethoxyl.

10. The process according to claim 8, wherein the coating comprises a polyalkylsiloxane, having a minor amount of substituent groups selected from hydroxyl, methoxyl, and ethoxyl and including substituents selected from ethyl, propyl, isopropyl and t-butyl groups.

11. The process according to claim 1, wherein the coating is a silicone and is from about 1 to 10 percent by weight of the catalyst support.

12. The process according to claim 1, wherein the coating is a silicone and is from about 2 to 5 percent by weight of the catalyst support.

13. The process according to claim 1, wherein the coating is a silicone and is from about $10^{-3}$ to $10^{-1}$ microns average thickness.

* * * * *